May 7, 1963     W. WELKOWITZ ETAL     3,088,323
PIEZORESISTIVE TRANSDUCER
Filed Feb. 10, 1960
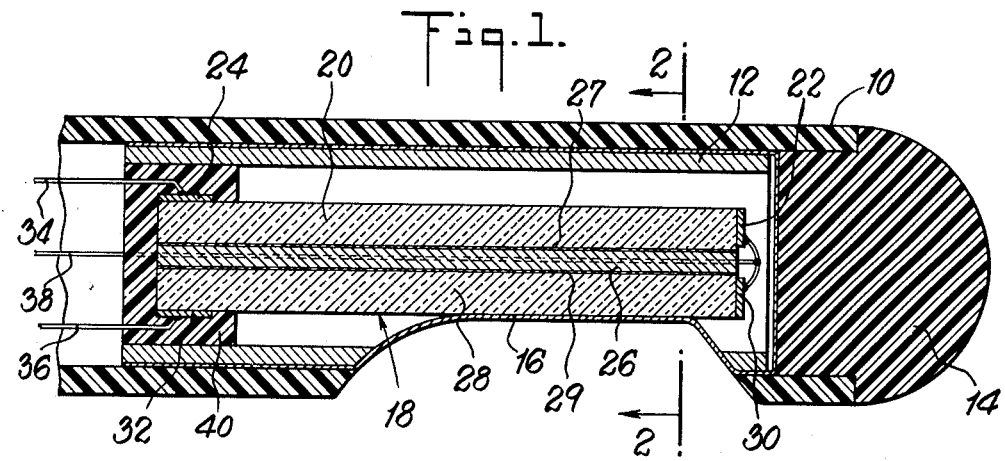
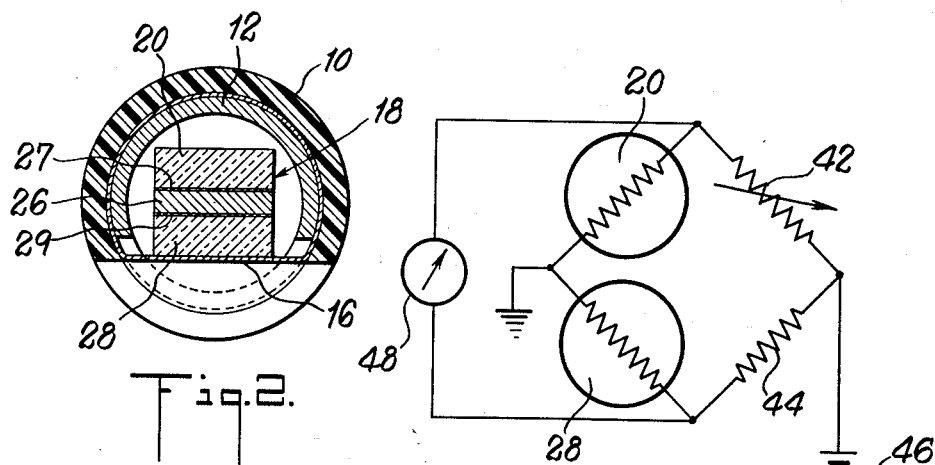
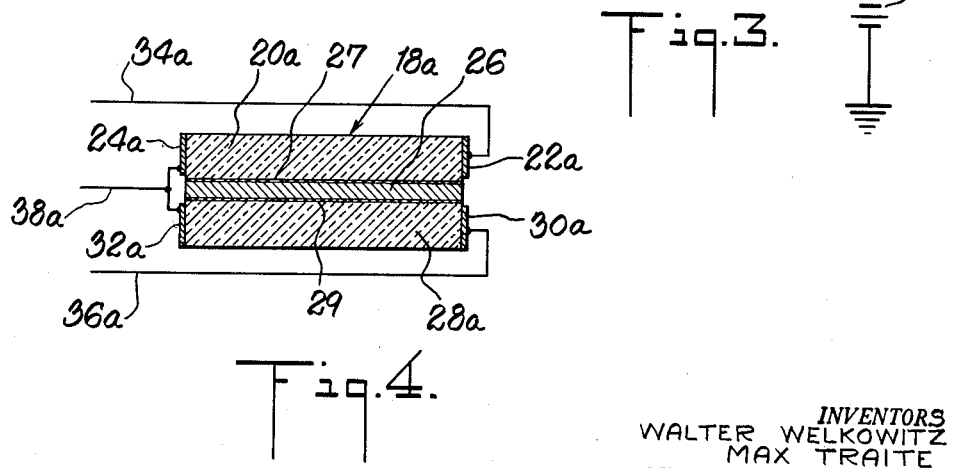
INVENTORS
WALTER WELKOWITZ
MAX TRAITE
BY
Cyrus D. Samuelson
ATTORNEY

3,088,323
PIEZORESISTIVE TRANSDUCER
Walter Welkowitz, Nixon, and Max Traite, East Brunswick, N.J., assignors to Gulton Industries, Inc., Metuchen, N.J., a corporation of New Jersey
Filed Feb. 10, 1960, Ser. No. 7,928
1 Claim. (Cl. 73—398)

This invention relates to piezoresistive transducers and more particularly to those piezoresistive transducers which are made of a pair of piezoresistive elements of a single semiconductor type and are formed into an integral unit.

An important object of the invention is to provide an improved transducer for use as the active element in strain gauges, microphones, phonograph pickups, pressure gauges and similar devices.

It is a further object of the invention to provide such a transducer which is sensitive to small amplitudes of and amplitude changes in applied mechanical stress and whose resistance change is linear with the applied mechanical stress throughout its useful range.

These and other objects, uses, features and advantages will be apparent in the course of the following description.

Piezoelectric and other types of transducers have previously been used as the active elements in devices of the kinds enumerated but none of them have possessed the sensitivity, linearity or other direct current characteristics of the piezoresistive transducers of the present invention. For example, piezoresistive strain gauges made in accordance with the teaching of the invention have been produced having a gauge factor of about 170 as compared with the usual gauge factor of about 2 for conventional wire strain gauges.

The piezoresistive transducers of the invention are preferably made in the form of a sandwich having a metal strip in the center and a piezoresistive strip on each side of the metal strip. P-type silicon cut in the 1, 1, 1 direction has been found to be excellent for these transducers. The notation 1, 1, 1 is in accordance with the so-called Miller indices which are commonly used in the crystallographic art. Increased sensitivity has been observed when using two piezoresistive strips of P-type silicon as compared with some prior art devices which disclose the combination of a P-type silicon piezoresistive with an N-type silicon piezoresistive.

In the accompanying drawings, forming a part of this application, and in which like numerals are employed to designate like parts throughout the same, FIGURE 1 is a longitudinal cross-sectional view of a piezoresistive transducer of the invention in a catheter, FIGURE 2 is a cross-sectional view along the line 2—2 of FIGURE 1, FIGURE 3 is a schematic diagram of a preferred circuit for use with the piezoresistive transducers of the invention, and FIGURE 4 is a view of a piezoresistive transducer of the invention, similar to that of FIGURE 1, showing the transducer, the transducer electrodes and the electrical leads.

In FIGURE 1, there is shown a longitudinal cross-sectional view of a transducer of the invention used in a catheter pressure gauge. The gauge is seen to comprise outer housing 10 of polyethylene or similar material, inner cylindrical shell 12 of brass or similar material and diaphragm 16 of Mylar, aluminum foil, rubber or similar material. The cantilevered transducer, shown generally as 18, is held in the housing by means of potting 40 which is formed of an air-hardening epoxy resin and the other end of the housing is sealed by air-hardening epoxy resin 14.

Elements 20 and 28 of transducer 18 are formed of piezoresistive semiconductor material such as P-type or N-type silicon or of any other material whose resistance changes with applied mechanical stress. In the embodiments illustrated P-type silicon cut in the 1, 1, 1 direction has been used for both elements but the teachings of the invention are equally valid if other piezoresistive materials are used. The designation 1, 1, 1 is in accordance with the so-called Miller indices which are commonly used in the crystallographic art. Electrodes 22 and 24 are of silver and are applied to element 20 by painting and firing them on or by any other technique well known in the art. They are placed on element 20 so that they are spaced as far apart as practicable in order to obtain the greatest possible change of resistance for a given mechanical stress. Electrodes 30 and 32 are similarly applied to element 28.

Since elements 20 and 28 are relatively brittle, the strips alone are fragile and the structure is strengthened by means of flexible metal strip 26 to which are bonded elements 20 and 28. The bonding is accomplished by means of insulating cement layers 27 and 29. Cement 27 and 29 is preferably composed of an epoxy resin sold under the trademark Stycast by the Permacel Division of Johnson & Johnson of New Brunswick, New Jersey. It can be seen that a portion of one surface of transducer 18 is in contact with diaphragm 16 so that any movement of diaphragm 16 is transmitted to transducer 18.

While the elements of transducer 18 may be connected in series with a source of D.-C. voltage such as a battery and an A.-C. output taken off as, for example, in the case of carbon granule microphones, it has been found in this invention that greater sensitivity is obtained if elements 20 and 28 are connected in a bridge circuit such as is shown in FIGURE 3. For this reason electrodes 22 and 30 are connected together and the common connection is brought out through potting 40 by lead 38. Electrodes 24 and 32 are connected to leads 34 and 36, respectively. These leads are likewise brought out through potting 40.

The bridge circuit of FIGURE 3 is seen to comprise D.-C. source of voltage 46 of about 5 volts, fixed resistor 44, variable resistor 42 and indicator 48. Variable resistor 42 is used to balance the bridge under conditions of normal pressure or to calibrate indicator 48 when known pressures are applied to diaphragm 16. An amplifier and oscilloscope or any other similar device may be employed in place of indicator 48 which is shown as a galvanometer.

Transducer 18a is similar to transducer 18 and is seen to comprise elements 20a and 28a which are bonded to flexible metal strip 26 by means of bonding cement 27 and 29. Electrodes 22a and 24a are applied to element 20a and electrodes 30a and 32a are applied to element 28a. Electrodes 24a and 32a are connected together and their common connection is connected to lead 38a. Electrical leads 34a and 36a are respectively connected to electrodes 22a and 30a.

By way of illustration and not by way of limitation, following is an example of piezoresistive transducer of the invention used in a catheter for measuring blood pressure:

| | |
|---|---|
| Type of semiconductor material | P-type silicon |
| Length of each semiconductor strip | inches 0.75 |
| Width of each semiconductor strip | do 0.025 |
| Thickness of each semiconductor strip | do 0.012 |
| Length of flexible metal strip | do 0.75 |
| Width of flexible metal strip | do 0.025 |
| Thickness of flexible metal strip | do 0.002 |
| Outside diameter of outer housing | do 0.075 |
| Inside diameter of outer housing | do 0.050 |
| Length of outer housing | do 0.95 |
| Range of pressures measured | p.s.i 0 to 10 |

In operation, the gauge is calibrated by means of the indicator and bridge balancing resistor and the device is placed in the medium whose pressure is to be observed. The results may be displayed on a meter scale or various types of recording meters may be used so that a permanent record of the measured pressures is obtained. It is obvious that gauges of the invention may be used to measure absolute pressures or comparative pressures which are either static or dynamic.

It will be apparent that the invention is not to be limited to the embodiments set forth in the drawings and description, and that variations may be made in form and construction without departing from the spirit and scope of the invention as defined in the appended claim.

What is claimed is:

A pressure gauge comprising, an elongated hollow housing, an elongated piezoresistive transducer including a pair of like elongated thin strips of piezoresistive semiconductor material, an elongated thin flexible metal reinforcing strip having planar dimensions substantially like those of the pair of elongated thin strips of piezoresistive semiconductor material, electrically insulating cement securing said pair of elongated thin strips of piezoresistive semiconductor material to opposite sides of said elongated thin flexible metal reinforcing strip and also electrically insulating the same therefrom, and two electrodes affixed at spaced apart points to each of said thin strips of piezoresistive semiconductor material such that they are separated from each other by a large portion of the length of said thin strips of piezoresistive semiconductor material, means for securing one end of said elongated piezoresistive transducer to one end of said elongated hollow housing for cantileverly mounting said elongated piezoresistive transducer in said elongated hollow housing, said elongated hollow housing having an opening in the side thereof adjacent the free end of said cantilever mounted elongated piezoresistive transducer, a flexible diaphragm mounted and sealed in said opening in the side of the elongated hollow housing and extending into the hollow housing and engaging the cantilever mounted elongated piezoresistive transducer for flexing the same in accordance with pressure conditions affecting said flexible diaphragm, and means for making electrical connections to said electrodes for connecting said elongated piezoresistive transducer into a measuring circuit.

References Cited in the file of this patent

UNITED STATES PATENTS

| | | |
|---|---|---|
| 2,906,980 | Traite | Sept. 29, 1959 |
| 2,939,317 | Mason | June 7, 1960 |

OTHER REFERENCES

Smith: "Piezoresistance Effect in Germanium and Silicon," 94, Phys. Rev., 1954 (pp. 42–49 relied on. Copy in Scientific Library).

"Semiconductors in Strain Gauges," by Mason, Bell Labs Record, vol. 37, 1959, pp. 7–9. (Copy in Div. 3, 338–2.)